RMS=140

Fig. 4A.

RMS=300

Fig. 4B.

RMS=600

Fig. 4C.

RMS=900

Fig. 4D.

RMS=1300

0.215" Sheet

| 90 | 140 | 200 | 300 | 400 | 450 | 600 | 700 | 800 | 1000 | 1300 | ←RMS |
|----|-----|-----|-----|-----|-----|-----|-----|-----|------|------|------|
|    |     |     |     | ▨ | ▨ | ▨ | ▨ | ▨ | ▨ | ▨ | 1225°F |
|    |     |     | ▨ | ▨ | ▨ | ▨ | ▨ | ▨ | ▨ | ▨ | 1250° |
|    |     |     | ▨ | ▨ | ▨ | ▨ | ▨ | ▨ | ▨ | ▨ | 1275° |

Fig. 6D.

0.190" Sheet

| 90 | 140 | 200 | 300 | 400 | 450 | 600 | 700 | 800 | 1000 | 1300 | ←RMS |
|----|-----|-----|-----|-----|-----|-----|-----|-----|------|------|------|
|    |     |     |     |     |     | ▨ | ▨ | ▨ | ▨ | ▨ | 1225°F |
|    |     |     |     | ▨ | ▨ | ▨ | ▨ | ▨ | ▨ | ▨ | 1250° |
|    |     |     | ▨ | ▨ | ▨ | ▨ | ▨ | ▨ | ▨ | ▨ | 1275° |

Fig. 6E.

0.120" Sheet

| 90 | 140 | 200 | 300 | 400 | 450 | 600 | 700 | 800 | 1000 | 1300 | ←RMS |
|----|-----|-----|-----|-----|-----|-----|-----|-----|------|------|------|
|    |     |     | ▨ | ▨ | ▨ |   |   |   |   |   | 1250°F |
|    |     |     | ▨ | ▨ | ▨ |   |   |   |   |   | 1275° |
|    |     | ▨ | ▨ | ▨ |   |   |   |   |   |   | 1300° |

INVENTORS
Glenn J. Lehr, Waldemar W. Oelke,
BY Thomas B. O'Connell and
Alfred E. Badger Nobbe & Swope
ATTORNEYS 0.090" Sheet

| 90 | 140 | 200 | 300 | 400 | 450 | 600 | 700 | 800 | 1000 | 1300 | ←RMS |
|----|-----|-----|-----|-----|-----|-----|-----|-----|------|------|------|
|    |     | ▨   | ▨   |     |     |     |     |     |      |      | 1250°F |
|    |     | ▨   | ▨   |     |     |     |     |     |      |      | 1275° |
|    | ▨   | ▨   | ▨   |     |     |     |     |     |      |      | 1300° |

*Fig. 6F.*

0.070" Sheet

| 90 | 140 | 200 | 300 | 400 | 450 | 600 | 700 | 800 | 1000 | 1300 | ←RMS |
|----|-----|-----|-----|-----|-----|-----|-----|-----|------|------|------|
|    |     | ▨   | ▨   |     |     |     |     |     |      |      | 1250°F |
|    |     | ▨   | ▨   |     |     |     |     |     |      |      | 1275° |
|    | ▨   | ▨   | ▨   |     |     |     |     |     |      |      | 1300° |
|    | ▨   | ▨   | ▨   |     |     |     |     |     |      |      | 1325° |

*Fig. 6G.*

0.060" Sheet

| 90 | 140 | 200 | 300 | 400 | 450 | 600 | 700 | 800 | 1000 | 1300 | ←RMS |
|----|-----|-----|-----|-----|-----|-----|-----|-----|------|------|------|
|    | ▨   | ▨   |     |     |     |     |     |     |      |      | 1300°F |
|    | ▨   | ▨   |     |     |     |     |     |     |      |      | 1325° |
|    | ▨   | ▨   |     |     |     |     |     |     |      |      | 1350° |

*Fig. 6H.*

INVENTORS
Glen J. Lehr, Waldemar W. Oelke,
Thomas B. O'Connell and
Alfred E. Badger
BY
Nobbe & Swope
ATTORNEYS Dec. 31, 1968  G. J. LEHR ET AL  3,419,371
TEMPERING GLASS BETWEEN ROUGHENED GLASS CONTACTING SURFACES
Filed July 12, 1965  Sheet 8 of 8

Sheet Glass
Relation Between Surface Texture Of Mold
And Thickness Of Glass For Various Average Dice Counts

Fig. 10.

Relationship Between
Dice Count And Tensile Stress
In Tempered Glass Of All Thicknesses
Including Plate And Sheet Glass

Fig. 11.

INVENTORS
Glen J. Lehr, Waldemar W. Oelke,
Thomas B. O'Connell and
Alfred E. Badger
BY
Nobbe & Swope
ATTORNEYS

United States Patent Office

3,419,371
Patented Dec. 31, 1968

3,419,371
TEMPERING GLASS BETWEEN ROUGHENED GLASS CONTACTING SURFACES
Glen J. Lehr, Oregon, Waldemar W. Oelke, Rossford, Thomas B. O'Connell, Toledo, and Alfred E. Badger, Maumee, Ohio, assignors to Libbey-Owens-Ford Glass Company, Toledo, Ohio, a corporation of Ohio
Filed July 12, 1965, Ser. No. 470,999
13 Claims. (Cl. 65—114)

ABSTRACT OF THE DISCLOSURE

A method and apparatus for tempering glass sheets wherein the sheets are cooled by contacting them with bodies of relatively high thermal conductivity which have been roughened to specified RMS microinch roughness values. Ranges of surface roughness and glass preheat temperatures are given for sheet and plate glass in various thicknesses to obtain various degrees of temper.

---

The present invention relates broadly to the heat treating or tempering of glass and more particularly to an improved tempering procedure in which preheated glass sheets or plates are chilled by direct contact with discontinuous surfaces of relatively high thermal conductivity.

The art of tempering glass is an old and well known one and, broadly stated, consists in heating an article to be tempered to substantially the point of softening of the glass and then rapidly chilling its outer surfaces to place the exterior under compression and the interior in tension. Such treatment not only increases the mechanical strength of the glass but also changes its breaking characteristics so that if and when broken it will disintegrate into relatively small, harmless particles instead of breaking into long, dangerous splinters as is the case with ordinary annealed glass.

Perhaps the earliest way of quenching or tempering heated glass sheets was by dipping into a bath of liquid (U.S. patent to F. B. A. Royer de la Bastie, No. 2,783, granted Aug. 12, 1874).

Subsequently Frederick Siemens proposed, in U.S. Patent No. 192,537, issued June 26, 1877, a modified tempering procedure in which the preheated glass sheets were chilled by pressing them between water cooled molds. However, in a later U.S. Patent, No. 199,583, issued Jan. 22, 1878, Siemens recognized the dangers of chill cracking with his earlier mold chilling technique and proposed to overcome this by interposing a pliable layer, such as a perforated sheet or wire gauze, to space or "isolate" the cooler molds from the hot glass.

However not until the 1900's did tempered glass come into any extensive commercial use. By that time it was generally recognized that the most practical way of chilling the preheated sheets was with blasts or jets of air directed against their opposite surfaces and this thinking has been largely followed up to the present time when tempered glass production has reached an extremely high level due to its widespread use in the backlights and side windows of automobiles.

Nevertheless Siemens' so-called plate or mold method of tempering was not completely lost sight of because in British Patent No. 910,917 (complete specification published Nov. 21, 1962) Bernard Long, a well known worker in the glass tempering field, proposed a modified form of the chilling molds or pressure plates of the early Siemens' patents. However Long, like Siemens, emphasized the undesirability of having the surfaces of the cooling plates in actual contact with the glass sheet and, also like Siemens, proposed that an air space be maintained between the surfaces of the cooling plate and the surface of the glass by the interposition of wires or the like.

Now it is the primary aim of the present invention to provide an improved method of tempering glass, and particularly glass sheets or plates, in which the chilling step is accomplished by direct contact of the preheated glass articles with plate or mold surfaces that have been textured to give improved tempering and to avoid chill cracking of the glass.

Briefly stated this and other objects are accomplished by the provision on the chilling plates or molds of specially contoured, patterned or textured surfaces that insure direct but discontinuous contact between the mold surface and the surface of the glass when they are brought together and provide a new and improved tempering technique that will greatly reduce if not entirely eliminate the difficulties encountered in the presently and previously employed tempering method.

Another object of the invention is the provision of a tempering procedure which will permit more accurate determination and control of the strength and breaking pattern of the tempered glass.

Another object is to provide a method and apparatus which can be successfully employed to temper glass sheets of a wide variety of thicknesses including ultra thin sheets.

Still another object is the provision of an improved tempering process and apparatus by which bent glass sheets can be as easily and accurately tempered as flat sheets.

Further objects and advantages of the invention will become more apparent during the course of the following description when read in connection with the accompanying drawings.

In the drawings, wherein like numerals are employed to designate like parts throughout the same.

Figure 1:
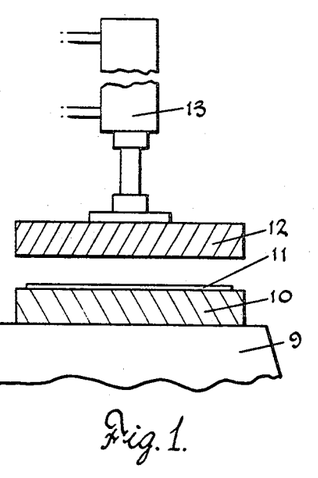
FIG. 1 is a vertical, sectional view through a simple form of tempering apparatus incorporating this invention.

Referring now more particularly to the drawings, there has been illustrated in FIG. 1 a simple type of apparatus with which the invention can be practiced. As there shown this includes a base 9 upon which is supported a lower mold plate 10 the upper surface of which is contoured or textured in a manner to be more fully hereinafter set forth. In use, a sheet of glass 11, which has been preheated to substantially its point of softening in a suitable oven or furnace (not shown), is placed on the textured surface of the plate 10 and a second plate 12 having a lower textured surface is then lowered by means of a hydraulic cylinder 13 into contact with the upper surface of the glass sheet 10 with sufficient pressure to insure adequate contact between the textured surfaces of the mold plates and the opposite surfaces of the glass sheet.

Figure 2:
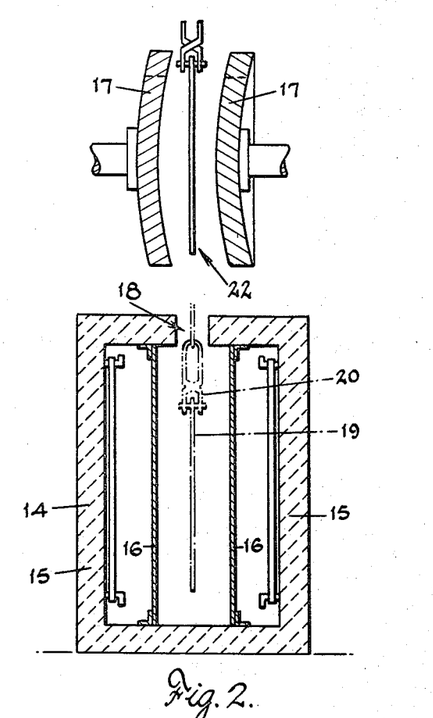
FIG. 2 is a vertical sectional view through a tempering apparatus designed to treat curved glass sheets in accordance with the invention.

In FIG. 2 there has been illustrated a modified form of apparatus which can be used to bend a glass sheet to a predetermined shape and to simultaneously temper the bent sheet. For this purpose there is provided a vertical furnace 14 which may be provided with electrical heating elements 15 and baffles or heat equalizing plate 16. Molds 17 of a shape designed to press bend a glass sheet to the desired curvature are mounted for reciprocal movement toward and away from each other above the furnace opening 18 and the glass contacting surfaces of the molds are textured in the manner of the facing surfaces of the plates 10 and 12 of FIG. 1. In operation a glass sheet 19 to be bent and tempered is located by means of tongs 20 in the broken line position within the heating chamber of the furnace 14. When the glass sheet has reached the desired temperature it is raised to the full line position 22 between the molds 17 which are then moved first into and then out of engagement with the glass sheet to simultaneously bend and temper the same.

Figure 3:
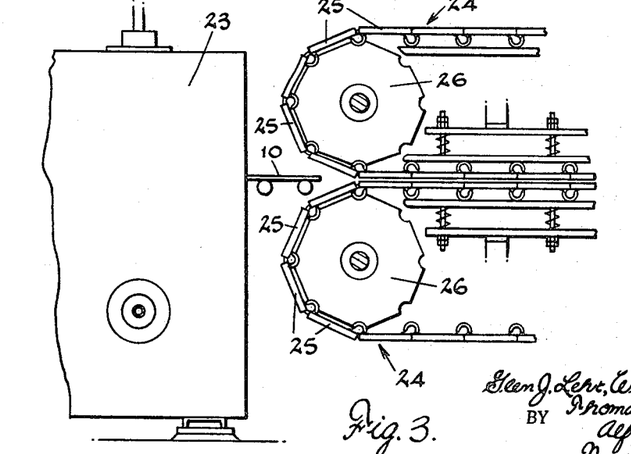
FIG. 3 is a longitudinal, sectional view through the chilling end of a glass sheet tempering apparatus embodying another modified form of the invention.

FIG. 3 discloses a further modified form of apparatus by means of which the invention can be practiced. In this case the glass 10 moves first through a horizontal heating furnace 23 and then between a pair of endless belts 24 which are made up of a plurality of plates 25 connected in end to end relationship and trained about sprocket wheels 26. The outer surfaces of the plates 25 are textured in the manner of the faces of the plates 10 and 12 of FIG. 1 and the molds 17 of FIG. 2 and will function to temper glass sheets moving therebetween in the same way. By proper control of glass movement through the furnace 23 each heated glass sheet to be tempered may be accurately positioned to be engaged by and lie between an upper and lower plate 25 of the moving belts 24 as it exits from the furnace.

It is well known in the art that when plate glass, for example, is heated above its annealing range and within a range in which the glass is mobile (roughly around 1225° F.) and then chilled as by blasting air against its opposite surfaces, the rapid cooling causes the glass surfaces to become rigid while the interior of the plate is at a higher temperature. The hotter interior glass contracts as it cools to room temperature and generates compressive stresses in the surfaces of the plate which are balanced by internal tensile stresses.

When glass treated in this way is broken for test purposes, as by the use of a center punch, fragments are produced that are of various sizes depending upon the amount of stress in the glass. High stresses produce fine particles or "rice patterns" while low stresses result in larger fragments that are generally associated with semi or partial tempering. Among the problems encountered in present-day commercial tempering procedures is the difficulty of achieving a constant or uniform temper every time; the presence of "iridescencies" or birefringent streaks or spots, observable in partially polarized daylight, that are characteristic of air quenching; and the difficulty in satisfactorily tempering thin glass sheets.

According to the present invention these and other difficulties in current commercial practices are overcome or eliminated, by a new and improved tempering procedure which involves bringing into intimate engagement with opposed surfaces of a body that has been preheated for the purpose, chilling plates or members that have their engaging surfaces contoured or textured to permit direct but discontinuous contact between them and the surfaces of the heated bodies.

One of the important features of the invention is the discovery that the "chill cracking," always experienced in the past when a sheet of hot glass was pressed between cooler metal plates to temper it, and which, when polished metal is used, is often so severe that the glass explodes into fragments between the plates, could be overcome by providing the plates with properly roughened or discontinuous surfaces to contact the hot glass.

Figure 4:
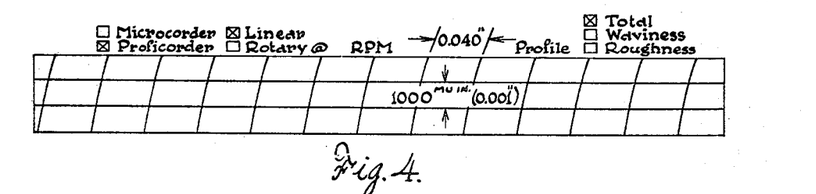
FIG. 4 is a fragmentary view of the chart paper for a profilcorder, showing the chart heading and scale.
Figure 4A:
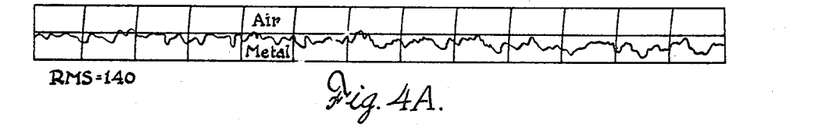
FIGS. 4A to 4E are fragmentary views, similar to FIG. 4, but showing five profilometer recordings for mold plates having surface textures typical of the invention.
Figure 4B:
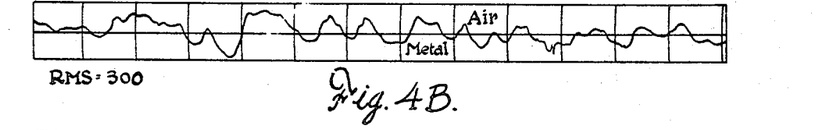
Figure 4C:
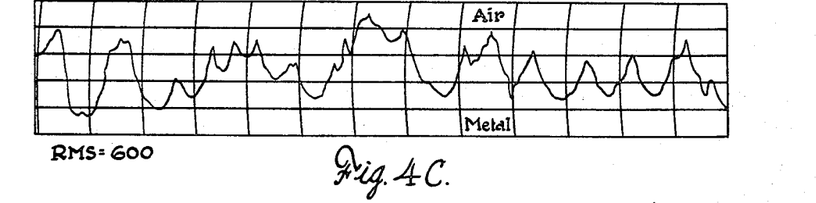
Figure 4D:
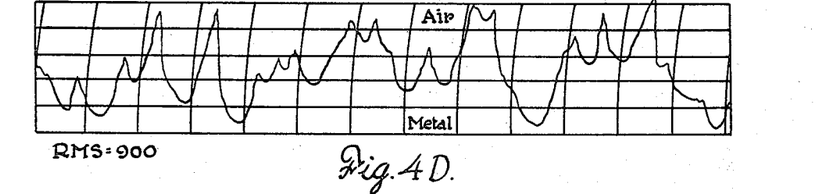
Figure 4E:
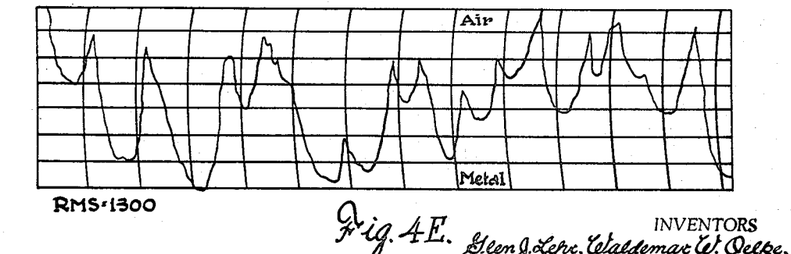

Because the roughening of the surfaces of the pressing plates or mold to achieve discontinuous contact reduces the areas of contact between the glass and the mold, it affects the cooling rates of the glass surfaces and so should be carefully controlled to produce the desired tempering results. In developing the invention the earliest roughening work was carried out on machined smooth surfaces of mating pairs of aluminum plates which were ball peened with a variety of agents ranging from 550 grade shot to ¼" balls at velocities and percent coverages to produce a variety of surface finishes, ranging from pebbly to fine matte. Surface textures produced in this way can be defined by so-called "Alman factors" but, to define the finishes more precisely and because they can also be produced in other ways such as by machining, etching, abrasive grinding, embossing and so forth, profilcorder measurements are preferably made and additional measurements of the total surface roughness with a "Group 4 Profilometer" furnishes root mean square values (in microinches). These will be referred to herein as RMS values. Such values are quantitative measurements of the total surface roughness and are numerical indices of the surface area of the mold which is effective for chilling the glass, and hence for controlling the temper. Small RMS values refer to matte finishes and high effective cooling areas, while larger RMS values indicate rougher surfaces with less cooling areas. To illustrate there has been shown in FIG. 4 a typical profilcorder chart heading and scale and, in FIGS 4A to 4E, five actual profilcorder recordings of aluminum mold plates with various surface textures, ranging from a matte finish (RMS=140) to a pebbly surface (RMS=1300), obtained from profilometer equipment using a roughness-width cut-off of 0.100".

In practicing the invention it has been found that, while pressing glass sheets between plates of high thermal conductivity to temper them, the surface contour or texture of the plates should have an RMS value between about 90 and 1500. Both plate and sheet glass between $\frac{1}{16}$ and ⅜ inch thick have been successfully tempered by this means, with the higher RMS values giving best results with the thicker sheets and the lower RMS values with the thinner.

It is recognized in the art that there are three variables that affect the strength and the degree of temper in tempered glass. These are, primarily, glass thickness, glass preheat temperature and rate of chilling, with only the latter being a function of the particular chilling technique employed.

According to this invention, the rate of chilling is determined essentially by the RMS value of the surface contacting the glass. Nevertheless, the invention can be used to determine the preheat temperature and the mold plate dwell time as well as the RMS value required to accurately produce a particular degree of temper in a glass sheet of given thickness and remarkably accurate control may be had by adjusting one or another or all of these variables.

To determine and to implement this a considerable number of experimental runs were made during which various glasses both within and outside of regular commercial thicknesses were tempered to varying degrees. In the control setup twelve aluminum plates were used as the chilling molds and were ball peened with 550 grade shot or ⅛" burnishing balls to produce surfaces having the following RMS values:

| Pair No. | RMS value |
|---|---|
| 1 | 90 |
| 2 | 140 |
| 3 | 200 |
| 4 | 300 |
| 5 | 400 |
| 6 | 450 |
| 7 | 600 |
| 8 | 700 |
| 9 | 800 |
| 10 | 1000 |
| 11 | 1300 |
| 12 | 1500 |

For control and reference the variables were limited to the essential ones, i.e., surface finish of molds (RMS values), glass preheat temperature and glass thickness, by employing mold plates of the same thermal conductivity, by maintaining them at room temperature (80°) and by employing maximum dwell time (above 30 seconds) for these tests.

The general procedure followed was similar to that illustrated in FIG. 1 and consisted of heating each one of a series of 3½" squares of glass 11 to a given temperature; transferring them successively to a ½" thick aluminum mold plate 10, pressing a duplicate aluminum mold plate 12 on top of the glass square with a 15 lb. load to insure adequate glass to metal contact and then removing the glass from the mold.

Each tempered glass square was then broken with a center punch and the number of dice counted over a one square inch area. To facilitate making these dice counts, enlarged photographs of the dice patterns (not included here) were made.

Information on the stress in the tempered glass was obtained by tempering laths (½" wide and 3½" long) of all thicknesses of glass, which were suitable for stress measurements with a quartz-wedge type apparatus.

Figure 6:
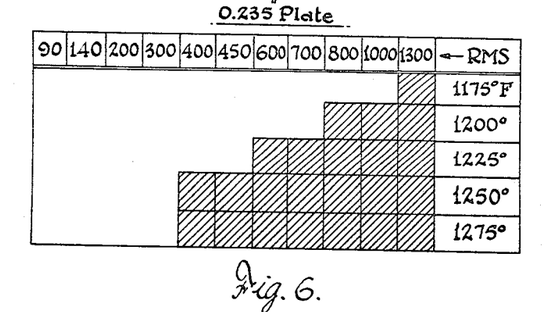
FIGS. 6 to 6H are charts showing fields of RMS values and glass preheat temperatures within which high quality full tempered glass sheets of thicknesses between 0.06" and 0.235" can be produced without danger of chill cracking.
Figure 6A:
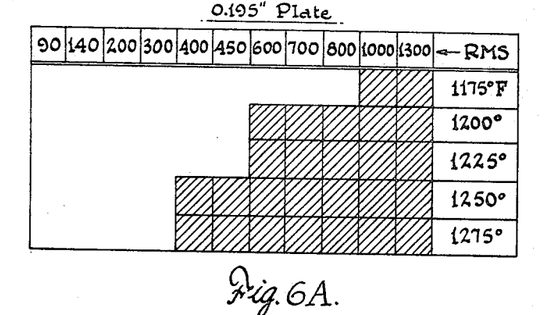
Figure 6B:
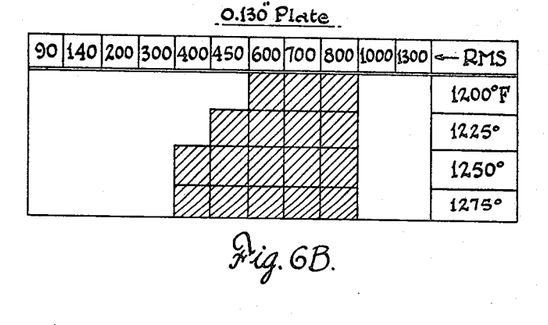
Figure 6C:
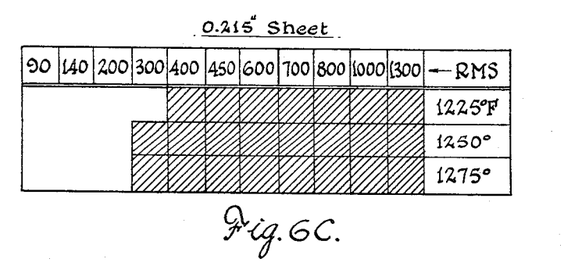
Figure 6D:
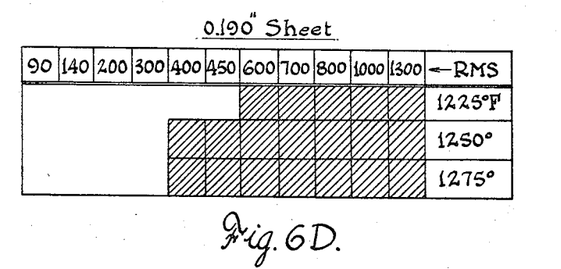
Figure 6E:
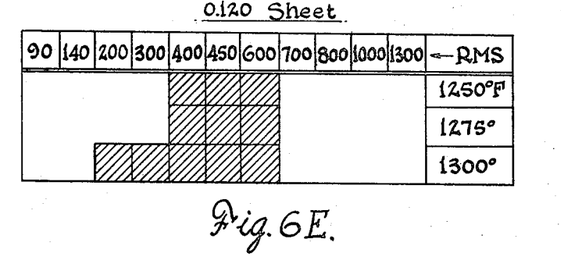
Figure 6F:
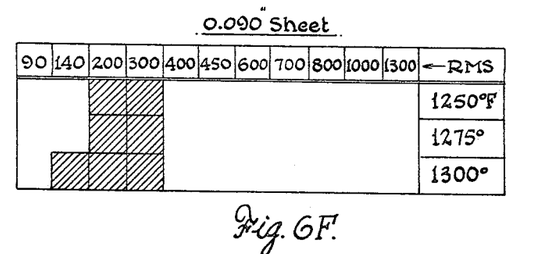
Figure 6G:
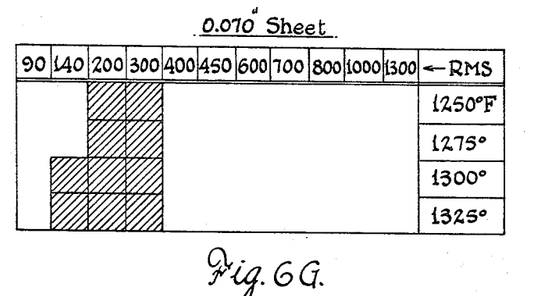
Figure 6H:
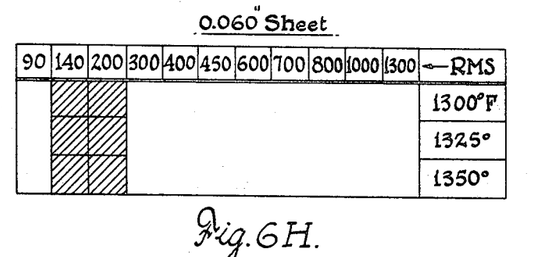

FIGS. 6 to 6H and 7 to 11 illustrate and compare the dice patterns (degree of temper) obtained on three thicknesses of plate glass and six thicknesses of sheet glass. Of these FIGS. 6 to 6H illustrate the fields of RMS values and glass preheat temperatures within which various thicknesses of sheet and plate glass can be tempered by pressing glass between textured surface aluminum plates to obtain full commercial temper (determined by dice count). Thus, each square in FIGS. 6 to 6H represents one of the photographs referred to above of a typical area of one of the series of tempered glass plates run in the tests that exhibited a dice count between 10 and 200 per square inch after breaking with a center punch. The tests were made by preheating the glass to temperatures ranging from 1175 to 1350° F. and then pressing between mold plates with surface finishes expressed as the root mean square (RMS). Fine textured surfaces (small RMS values toward the left side of FIGS. 6 to 6H) produced the most highly tempered glass and "rice" dice patterns, as a result of the greater glass to metal contact and more rapid chilling. The areas covered by the photograph representing squares shows the surface finishes of the molds, expressed in RMS values, and the glass preheat temperatures best suited for tempering glass of various thicknesses. These areas are limited on the left by combined glass temperatures and RMS values which may cause chill cracking and on the right by combined temperatures and RMS values that give larger dice patterns, indicating a lesser degree of temper.

FIG. 6A, pertaining to .195" thick plate glass (³⁄₁₆" plate), shows that the field of full commercial tempering is very nearly the same as that for ¼" plate glass (FIG. 6).

FIG. 6B illustrates the more restricted field for best tempering in .130" thick plate glass (⅛" plate). In this case, the coarsely textured molds denoted by 1000 and 1300 RMS produce large glass fragments indicating semi or partial temper, as did even the 700 and 800 RMS plates at lower temperatures.

FIGS. 6C, 6D and 6E illustrates the field for strongest tempering of heavy sheet glass (0.215", 0.190" and 0.120" thick); while FIGS. 6F, 6G and 6H show the more restricted fields for best tempering of thinner sheet glass (.090", .070" and .060" or nominal single strength, 15–17 oz., and 12–14 oz. strengths, respectively). Furthermore, it will be noted that higher preheat temperatures are required for maximum tempering of these lighter glasses.

In the tests it was found that a minimum preheat temperature of the glass is necessary to produce maximum temper. For example, preheating .235" plate glass (¼" plate) to 1175° F. was not sufficient even with molds having high RMS values, and relatively large fragments were formed on breaking. A preheat temperature of 1200° F. however produced full temper, shown by smaller fragments. Preheat temperatures of 1225°, 1250° and 1275° for ¼" plate glass formed tempered glasses with dice patterns which were practically indistinguishable.

The temperature ranges where dice counts were practically unchanged for all glasses tested are listed in the following table:

| Glass thickness and type | Preheat temperatures used for averaging dice counts (° F.) |
|---|---|
| .235" plate glass (¼" plate) | 1,225, 1,250, 1,275 |
| .195" plate glass (³⁄₁₆" plate) | 1,225, 1,250, 1,275 |
| .130" plate glass (⅛" plate) | 1,250, 1,275 |
| .215" sheet glass (⁷⁄₃₂" sheet) | 1,225, 1,250, 1,275 |
| .190" sheet glass (³⁄₁₆" sheet) | 1,225, 1,250, 1,275 |
| .120" sheet glass (D.S. sheet) | 1,250, 1,275, 1,300 |
| .090" sheet glass (S.S. sheet) | 1,250, 1,275, 1,300 |
| .070" sheet glass (15–17 oz. sheet) | 1,275, 1,300, 1,325 |
| .060" sheet glass (12–14 oz. sheet) | 1,300, 1,325, 1,350 |

Since the dice patterns formed by each pair of molds for a given glass thickness were equivalent over the stated temperature ranges, the dice counts were averaged for plotting the relation between the average dice count and the surface texture of the molds.

Figure 7:
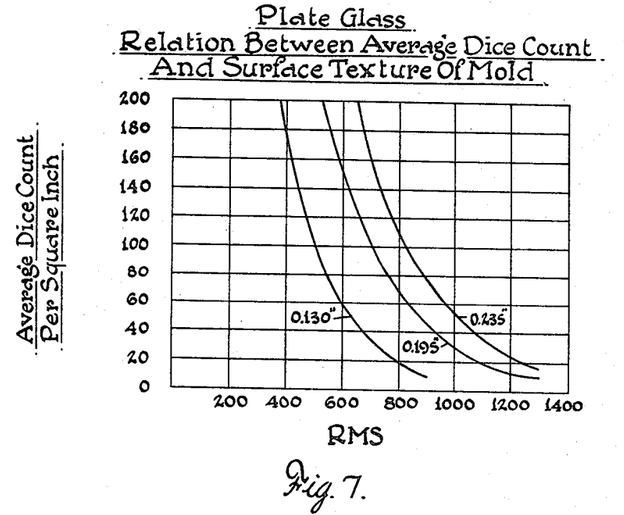
FIG. 7 is a graph showing the relationship between the average dice count (temper) desired in the glass and the surface texture of the chilling mold plate for three thicknesses of plate glass.

It was found that, within experimental error, a semi-log plot of the average number of dice per sq. in. against the RMS value of the mold surface resulted in a straight line. FIG. 7 is a rectilinear plot of this as it relates to plate glass and shows the relation between the dice counts of the three thicknesses of tempered plate glass which were produced by pressing the preheated glass between molds of various surface textures.

Figure 8:
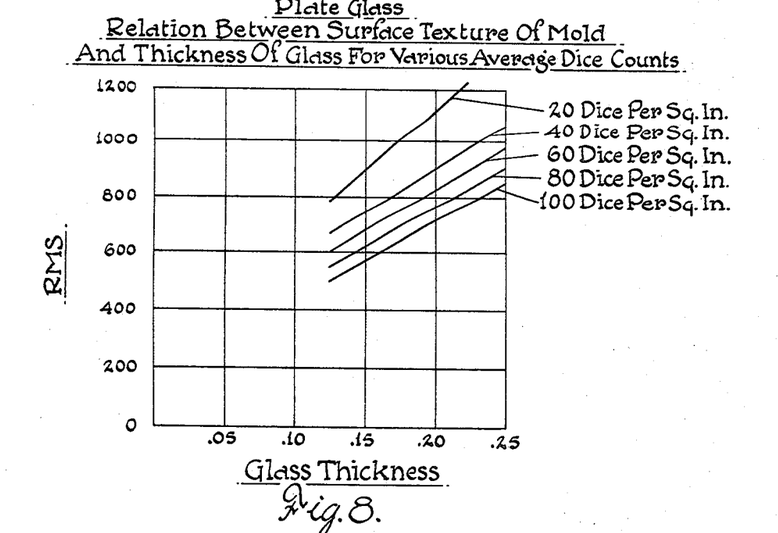
FIG. 8 is a graph showing the relationship between plate glass thickness and surface texture of the chilling mold plate in obtaining various dice counts.

Finally, FIG. 8 which was derived from FIG. 7 sets forth the surface texture of molds which should be used for producing various dice patterns for different thicknesses of plate glass. For example, if 20 dice per sq. in. are desired for a plate glass thickness of .150", FIG. 8 shows that the mold should be given a surface texture equivalent to an RMS value of about 880.

Figure 9:
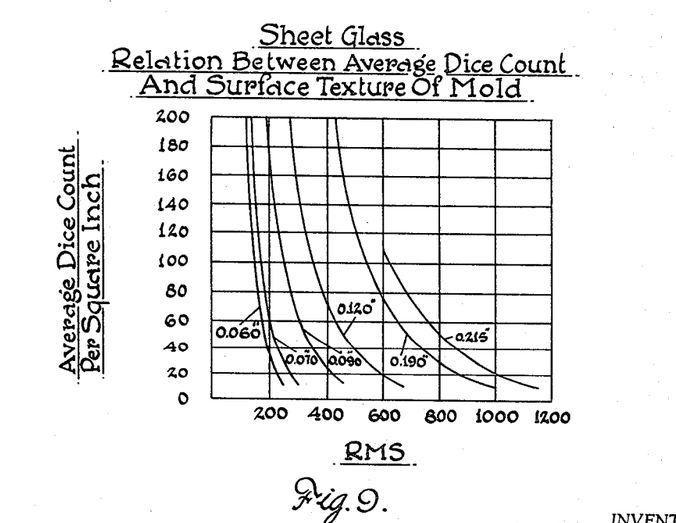
FIG. 9 is a graph showing the relationship between the average dice count (temper) desired in the glass and the surface texture of the chilling mold plate for six thicknesses of sheet glass.
Figure 10:
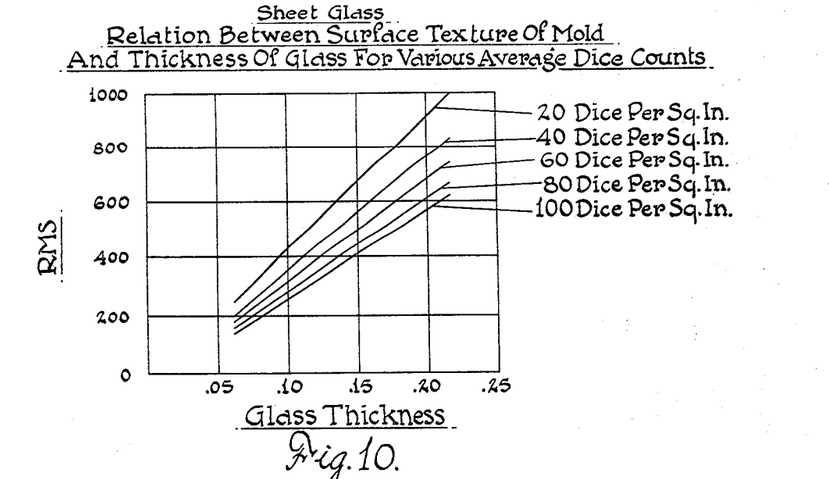
FIG. 10 is a graph showing the relationship between sheet glass thickness and surface texture of the chilling mold plate in obtaining various dice counts.

Results of the trials with various thicknesses of sheet glass paralleled those with plate glass but the former were extended to some of the lighter strengths which are available commercially. FIGS. 9 and 10 pertain to the results of tempering sheet glass. For example, if 20 dice/sq. in. are desired in tempered sheet glass of .150" thickness, FIG. 10 shows that the mold surfaces should be textured or roughened to an RMS value of about 680.

The data shown in FIGS. 7 to 10 may be expressed by simple mathematical relationships to show the expected dice counts and the surface texture of the mold surfaces. In the following equations D is the dice count (number of dice per sq. in.) while R refers to the surface texture of the mold (RMS values).

For plate glass:
.235″, log D=3.385—.00168R
.195″, log D=3.230—.00176R
.130″, log D=3.220—.00244R For sheet glass:
.215″, log D=3.162—.00187R
.190″, log D=3.200—.00220R
.120″, log D=3.120—.00317R
.090″, log D=3.250—.00500R
.070″, log D=3.555—.00775R
.060″, log D=3.500—.01000R The relations between mold finish (RMS values) and the thickness (t) of plate or window glass, as shown in FIGS. 8 and 10, may be expressed by linear mathematical equations to determine the temper produced in the glass, as measured by dice counts in the broken samples. Thus, the mold finish may be prescribed which will produce a desired dice pattern in glasses of various thicknesses.

In the following equations, RMS denotes the root mean square of the surface of the mold as obtained from profilometer readings and t is the glass thickness in inches.

In plate glass for:
20 dice per sq. in., RMS=4480t+208
40 dice per sq in., RMS=3810t+165
60 dice per sq. in., RMS=3430t+155
80 dice per sq. in., RMS=3140t+140
100 dice per sq. in., RMS=3140t+90

While, in window glass for:
20 dice per sq. in., RMS=4970t−68
40 dice per sq. in., RMS=4190t−50
60 dice per sq. in., RMS=3800t−53
80 dice per sq. in., RMS=3370t−40
100 dice per sq. in., RMS=3050t−33

The foregoing shows that the mold finish, as well as the glass preheat temperature, may be specified for producing any dice pattern in tempering plate or sheet glass of any commercial strength in accordance with this invention. Moreover, although the reported trials were made with a minimum thickness of .060″ for sheet glass, additional experiments have shown that sheet glass as thin as .048″ may be tempered in the same way by employing more finely textured molds, such as can be made by grinding the aluminum mold plates with 220 grit abrasive.

Figure 11:
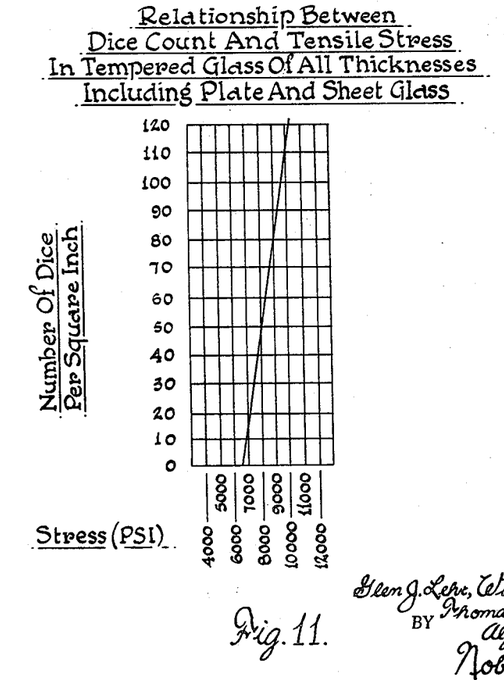
FIG. 11 is a graph showing the relationship between average dice count and internal tensile stress in the glass.

Knowledge of the relation between the dice patterns and the internal stress in tempered glass is of interest here and FIG. 11 indicates the general relationship. This figure shows the dice counts of all individual samples of tempered glass, both plate and sheet glass of all strengths, plotted against the tensile stresses measured on tempered laths of glass. Since the spread of the results is large, the averaged straight line relation is only approximate. For example, if a dice count of 20 dice per sq. in. is determined, the indicated internal tensile stress is about 7200 p.s.i. Similarly, 100 dice per sq. in. corresponds to 9700 p.s.i. tensile stress in the glass. Tensile stresses up to 14000 p.s.i. have been measured in heavier strength glasses (as in ¼″ plate glass and 7/32″ sheet glass) but dice counts in such highly tempered glasses are questionable due to the explosive nature of the breakage.

Although as pointed out above the studies reported here are based on the use of aluminum mold plates, with a thermal conductivity of about 1430 B.t.u.'s/hour/square foot/°F./inch, other work has shown that materials such as copper, graphite, refractory coated materials, stainless steel, with a thermal conductivity of only slightly over 100 B.t.u./hour/square foot/°F./inch, and so forth can also be used to achieve temper in the glass by allowing for the difference in the thermal conductivity of the different mold materials.

Generally speaking the mold materials suitable for practicing this invention are materials that are classed as good thermal conductors, having a thermal conductivity ranging roughly between 100 and 2900 B.t.u./hour/square foot/°F./inch, as contrasted with "poor" conductors or thermal insulating materials.

Also the chilling molds were maintained at room temperature (around 80° F.) for these trials. However within reasonable limits the mold temperature was found to be relatively unimportant (variations of 40 to 180° F. produced no significant change in temper); although it must be realized that mold temperatures that are excessively high or low would have an effect on the chilling rate and, if employed, would have to be compensated for.

For example, a large increase in the temperature of the pressing molds produces marked loss in temper of the glass. In a series of trials with ¼″ plate glass, in which the temperature of the molds was increased progressively, it was found that, with a mold temperature of 500° F., the dice count was only about ¼ the count obtained when the molds were used near room temperature.

Figure 5:
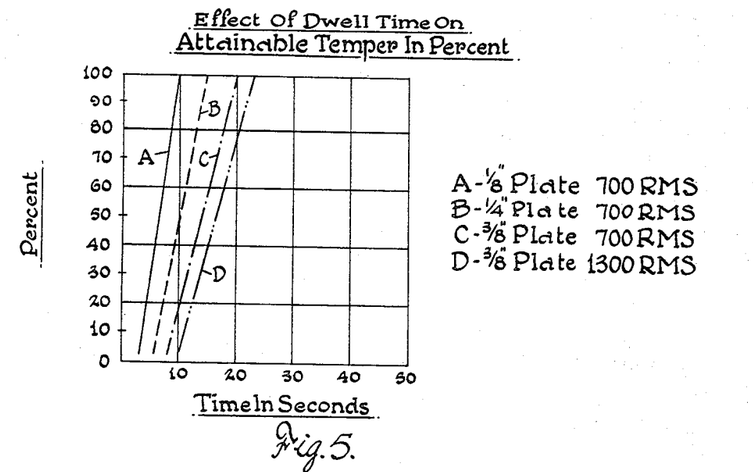
FIG. 5 is a chart showing the effect of mold plate dwell time on temper in various thicknesses of glass.

Similarly a dwell time (time the mold plates remained in contact with the glass) of at least two minutes was employed in each case. As can be seen from the chart of FIG. 5 this insured maximum temper regardless of glass thickness and RMS values. However, variations in dwell time can be employed to control temper. Thus, line A of FIG. 5 shows the variation in temper produced in ⅛″ plate glass pressed between the molds for various dwell-times. The ordinates on the graph show the ratios of the actual dice counts to the maximum dice counts obtainable after prolonged dwell-times. In the case of ⅛″ plate glass, it is seen that a dwell-time of 10 seconds is required to attain the maximum temper (greatest number of dice). Similarly, a dwell-time of 15 seconds is required for ¼″ glass, while the dwell-time for ⅜″ glass is 20 seconds. These dwell-times, which represent the minimum times required to attain the maximum temper in the glass, are dependent on the surface texture of the mold plates, as illustrated on the right in the figure. This line shows that a dwell-time of 23 seconds applies to the use of a coarser finished plate (RMS=1300) for tempering ⅜″ plate glass, as compared to the 20 second dwell-time given above for finer textured mold plates (RMS=700).

For some practical applications, it may not be desired to attain the maximum temper with a given set of plates, since rice patterns may be produced. FIG. 5 shows that less temper may be produced by merely decreasing the time in which the glass is pressed between the mold plates.

It is to be understood that the forms of the invention herewith shown and described are to be taken as illustrative embodiments only of the same, and that various changes in the shape, size and arrangement of parts, as well as various procedural changes may be resorted to without departing from the spirit of the invention.

We claim:

1. A method of tempering glass in sheet form which comprises heating said sheet to substantially the softening point of the glass and then intimately contacting the opposite surfaces thereof with bodies having a thermal conductivity of at least 100 B.t.u. per hour per square foot per degree F. per inch, said bodies having glass contacting surfaces roughened to RMS values between 90 and 1500 microinches.

2. A method of bending and tempering glass in sheet form which comprises heating said sheet to substantially the softening point of the glass and then pressing the same to the shape desired between bodies of relatively high thermal conductivity having complementary glass contacting surfaces roughened to RMS values between 90 and 1500 microinches.

3. A method of tempering plate glass of a thickness between ⅛″ and ¼″ which comprises heating said glass to substantially its point of softening and intimately contacting the opposite surfaces thereof with bodies having relatively high thermal conductivity and glass contacting surfaces to RMS values between 400 and 1300 microinches.

4. A method of tempering plate glass in thicknesses between 0.235″ and 0.195″ which consists in heating said glass to a temperature between 1175° F. and 1275° F. and then intimately contacting the opposite surfaces thereof with bodies of aluminum having glass contacting surfaces roughened to an RMS value between 400 and 1300 microinches.

5. A method of tempering plate glass of approximately ⅛″ thickness which comprises heating the glass to a temperature between 1200° and 1275° F. and then intimately contacting the opposite surfaces thereof with bodies of aluminum having glass contacting surfaces roughened to RMS values between 400 and 800 microinches.

6. A method of tempering sheet glass which comprises heating a sheet to a temperature between about 1225° and 1350° F., and intimately contacting the opposite surfaces thereof with matching bodies having a thermal conductivity of at least 100 B.t.u. per hour per square foot per degree F. per inch and having glass contacting surfaces roughened to an RMS value between 90 and 1500 microinches.

7. A method of tempering sheet glass of thicknesses between approximately 0.215″ and 0.190″ which comprises heating a sheet to a temperature between about 1225° and 1275° F. and intimately contacting the opposite surfaces thereof with matching bodies of aluminum having glass contacting surfaces roughened to an RMS value between 400 and 1300 microinches.

8. A method of tempering sheet glass of approximately 0.120″ thickness which comprises heating a sheet to a temperature between about 1250° to 1300° F. and intimately contacting the opposite surfaces thereof with matching bodies of aluminum having glass contacting surfaces roughened to an RMS value between 200 and 600 microinches.

9. A method of tempering sheet glass of thicknesses between approximately 0.090″ and 0.070″ which comprises heating a sheet to a temperature between about 1250° to 1325° F. and intimately contacting the opposite surfaces thereof with matching bodies of aluminum having glass contacting surfaces roughened to an RMS value between 140 and 300 microinches.

10. A method of tempering sheet glass of approximately 0.060″ thickness which comprises heating a sheet to a temperature between about 1300° to 1350° F. and intimately contacting the opposite surfaces thereof with matching bodies of aluminum having glass contacting surfaces roughened to an RMS value between 140 and 200 microinches.

11. A method of heat treating glass in the form of a sheet or plate of given thickness to temper the same; which comprises heating said glass to a temperature above its annealing range then rapidly chilling the same by contacting opposite surfaces thereof with mold bodies of relatively high thermal conductivity and roughened glass contacting surfaces; and establishing the degree of temper in said heat treated glass by the selected relationship of said glass temperature, the RMS roughness values of the mold surfaces, and the thermal conductivity and dwell time of said mold bodies.

12. A method as defined in claim 11 in which said glass temperature is selected within a range between about 1175 and 1350° F., said thermal conductivity is selected within a range between about 100 and 2900 B.t.u. per hour per square foot per degree F. per inch, said RMS values are selected within a range between about 90 and 1500 microinches, and said dwell time is selected within a range between about three seconds and 30 seconds.

13. Apparatus for tempering glass sheets or plates comprising a pair of matching chilling bodies of relatively high thermal conductivity arranged in spaced face to face relation and having their facing surfaces textured to RMS values between 90 and 1500, means for causing relative movement between said bodies from said spaced relation toward a contacting relationship, and means for locating a glass sheet and for removing it from between the roughened surfaces of said bodies.

References Cited
UNITED STATES PATENTS

| | | | |
|---|---|---|---|
| 2,131,404 | 9/1938 | Long | 65—287 |
| 3,150,948 | 9/1964 | Gladieux et al. | 65—25 |
| 3,262,768 | 7/1966 | Carson | 65—287 |

DONALL H. SYLVESTER, *Primary Examiner.*

R. V. FISHER, *Assistant Examiner.*

U.S. Cl. X.R.

65—287, 348